United States Patent [19]

Maeda

[11] Patent Number: 5,754,281
[45] Date of Patent: May 19, 1998

[54] RANGE FINDER

[75] Inventor: Kazuyuki Maeda, Yokohama, Japan

[73] Assignee: Canon Kabushiki Kaisha, Tokyo, Japan

[21] Appl. No.: 574,078

[22] Filed: Dec. 18, 1995

[30] Foreign Application Priority Data

Dec. 28, 1994 [JP] Japan .................. 6-337451

[51] Int. Cl.$^6$ .................................... G01C 3/00
[52] U.S. Cl. ............................. 356/3.08; 396/120
[58] Field of Search .................. 356/3.08; 396/120

[56] References Cited

U.S. PATENT DOCUMENTS

| 4,814,810 | 3/1989 | Ishiguro | 354/403 |
| 5,264,893 | 11/1993 | Nonaka | 354/403 |
| 5,361,117 | 11/1994 | Nonaka | 354/403 |
| 5,613,167 | 3/1997 | Suzuki | 396/106 |

FOREIGN PATENT DOCUMENTS

7-120253  5/1995  Japan .

*Primary Examiner*—Mark Hellner
*Attorney, Agent, or Firm*—Fitzpatrick, Cella, Harper & Scinto

[57]  ABSTRACT

An apparatus that measures the distance to an object by projecting light, receiving reflected light of the projected light through at least two light receiving devices disposed at different positions, and combining information from the two light receiving device to cancel, the influence of a change in the centroid position of the reflected light at the same distance. The apparatus has a signal processor performs a first processing operation for determining the distance to the object by combining information from the two light receiving devices, and a second processing operation for determining the distance to the object using information from only one of the two light receiving devices.

32 Claims, 8 Drawing Sheets

RANGE FINDER

BACKGROUND OF THE INVENTION

1. Field of the Invention

The present invention relates to an improvement in a range finder that measures the distance to an object by projecting light to the object and receiving reflected light from the object.

2. Description of the Related Art

Conventional active type range finders for cameras that operate by projecting light from light projecting means to an object, receiving light reflected back from the object, and calculating the distance to the object based on the quantity of reflected light received or the light receiving position.

In contrast with passive type range finders, such active type range finders advantageously can measure the distance to a low-contrast object and measure the distance in the dark without using auxiliary light. Disadvantageously, however, active type range finders may make a measurement error if a measured object has a certain contrast or if the entire projected light beam does not hit the object. This is because the centroid position of the reflected light spot of the projected light beam changes in accordance with the contrast and the incompleteness of the light spot.

To solve this problem, a method has been proposed in Japanese Patent Application No. 287280/1993, that uses two light receiving means positioned in asymmetrical positions on a light projecting means in the base length direction. A change in light centroid position due to the contrast condition of an object is canceled by using outputs from the two light receiving means.

The above-described method is advantageous because it allows an active automatic focusing apparatus to be unaffected, in theory, by the contrast of the object. According to this method, however, the two light receiving means are disposed at different distances from the light projecting means. Therefore, the light image received on the light receiving means having the larger distance from the light projecting means along the base length direction moves out of the sensing area of the light receiving sensor when measuring a short distance, resulting in a measurement error.

SUMMARY OF THE INVENTION

In view of this problem, an object of the present invention is to provide a range finder having a large accurate distance measuring range including long and short distances.

To achieve this object, according to one, the present invention relates to a range finder that measures the distance to an object by projecting light, to the object receiving light reflected from the object through at least two light receiving devices disposed at different positions, and by combining information from the two light receiving devices to correct, the influence of any change in the centroid position of the reflected light at the same distance. The apparatus comprises a signal processor that performs first processing that determines the distance to the object by combining information from the two light receiving devices, and second processing that determines the distance to the object by using information from one of the two light receiving devices.

Other aspects of the invention will become apparent from the following detailed description of the preferred embodiments of the invention.

DESCRIPTION OF THE PREFERRED EMBODIMENTS

Preferred embodiments of the present invention will be described with reference to the accompanying drawings.

Figure 1:
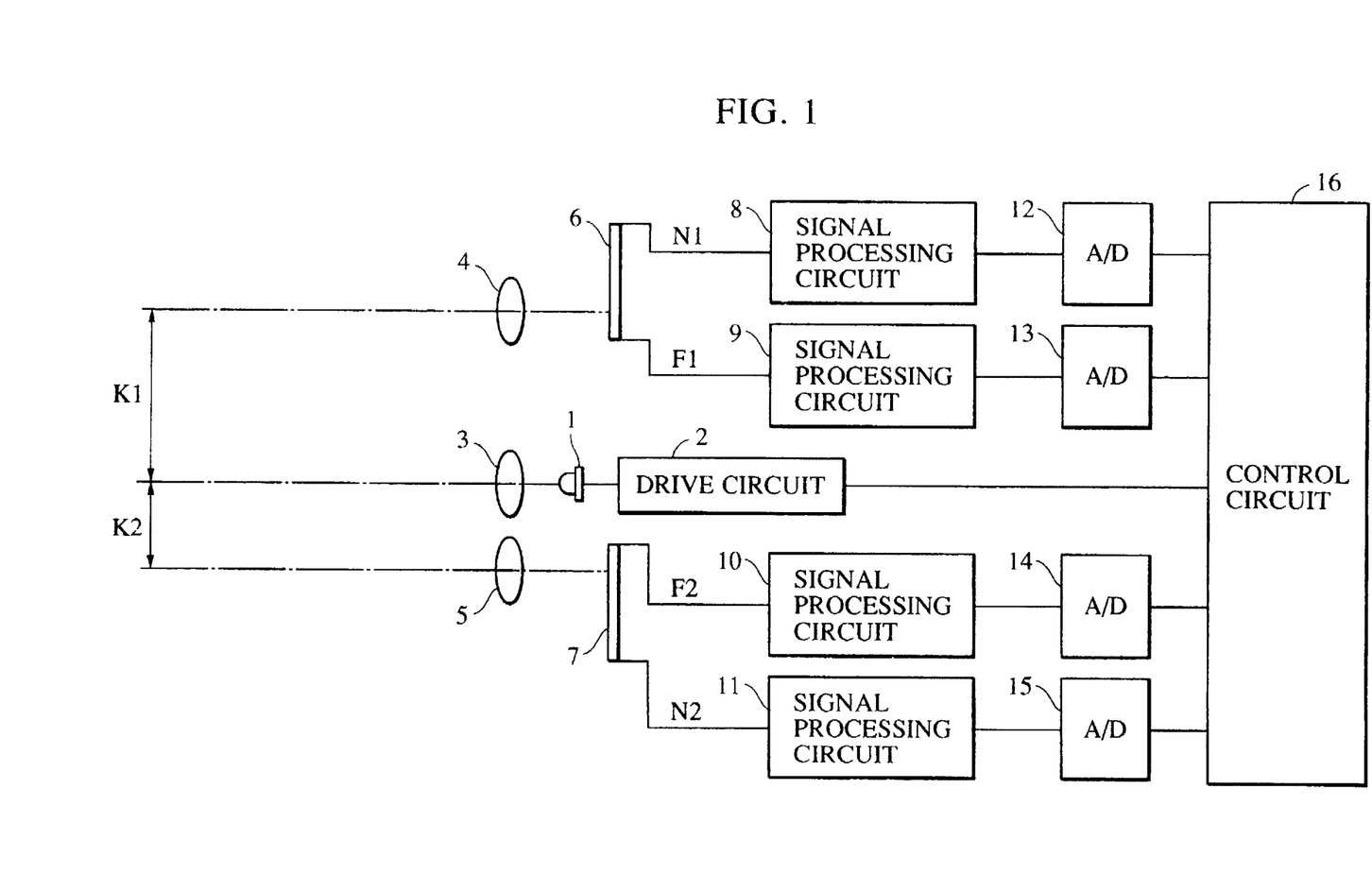
FIG. 1 is a block diagram of the configuration of a range finder that represents a first embodiment of the present invention.

FIG. 1 is a block diagram of the configuration of essential components of a range finder that represents a first embodiment of the present invention, i.e., an application of the present invention to a camera.

A light projecting device 1 is an infrared light emitting diode, a xenon tube or any other lamp device. A drive circuit 2 drives the light projecting device 1. A light projecting lens 3 condenses light (or infrared light) projected from the light projecting device 1 and directs the light toward an object. The light emitting device 1, the drive circuit 2 and the light projecting lens 3 constitute light projecting means. Light receiving lenses 4 and 5 are disposed so as to have optical axes parallel to that of the light projecting lens 3.

Assuming that the distance between the optical axes of the light projecting lens 3 and the light receiving lens 4 is K1 and that the distance between the optical axes of the light projecting lens 3 and the light receiving lens 5 is K2, the light projecting lens 3 and the light receiving lens 5 are placed so that K1≠K2. In this embodiment, K1>K2.

Light receiving sensors 6 and 7 corresponding to the light receiving lens 4 and 5 are formed of semiconductor position sensing devices (PSD) or the like. Light projected toward the object (distance-measured object) is reflected by the object, and a part of the reflected light is condensed by the light receiving lenses 4 and 5 to form images on the sensors 6 and 7. In this embodiment, 2-split silicon photo cells (SPC) or the like may be used as the light receiving sensors. From opposite ends of the respective sensors 6 and 7, a signal current F corresponding to a side of the sensor closer to the light projecting means and a signal current N more remote from the light projecting means are output, and the ratio of the signal outputs F and N changes according to the centroid position of the received-light image. Signals F1 and N1 are output from the light receiving sensor 6 while signals F2 and N2 are output from the light receiving sensor 7. In FIG. 1, a side view of each of the light receiving sensors 6 and 7 is illustrated. "F1+N1" and "F2+N2" are hereinafter referred to as a first received-light signal and a second received-light signal, respectively.

Signal processing circuits 8 to 11 convert the outputs from the light receiving sensors 6 and 7 into voltages, amplify alternating current signals of the converted voltages and integrate the amplified signals. A/D converters 12 to 15 convert the analog signals from the signal processing circuits 8 to 11 into digital signals. A control circuit 16 formed of a microcomputer or the like controls the above-mentioned light projecting means and processes the digitized received-light signals to obtain distance measurement information.

Figure 2:
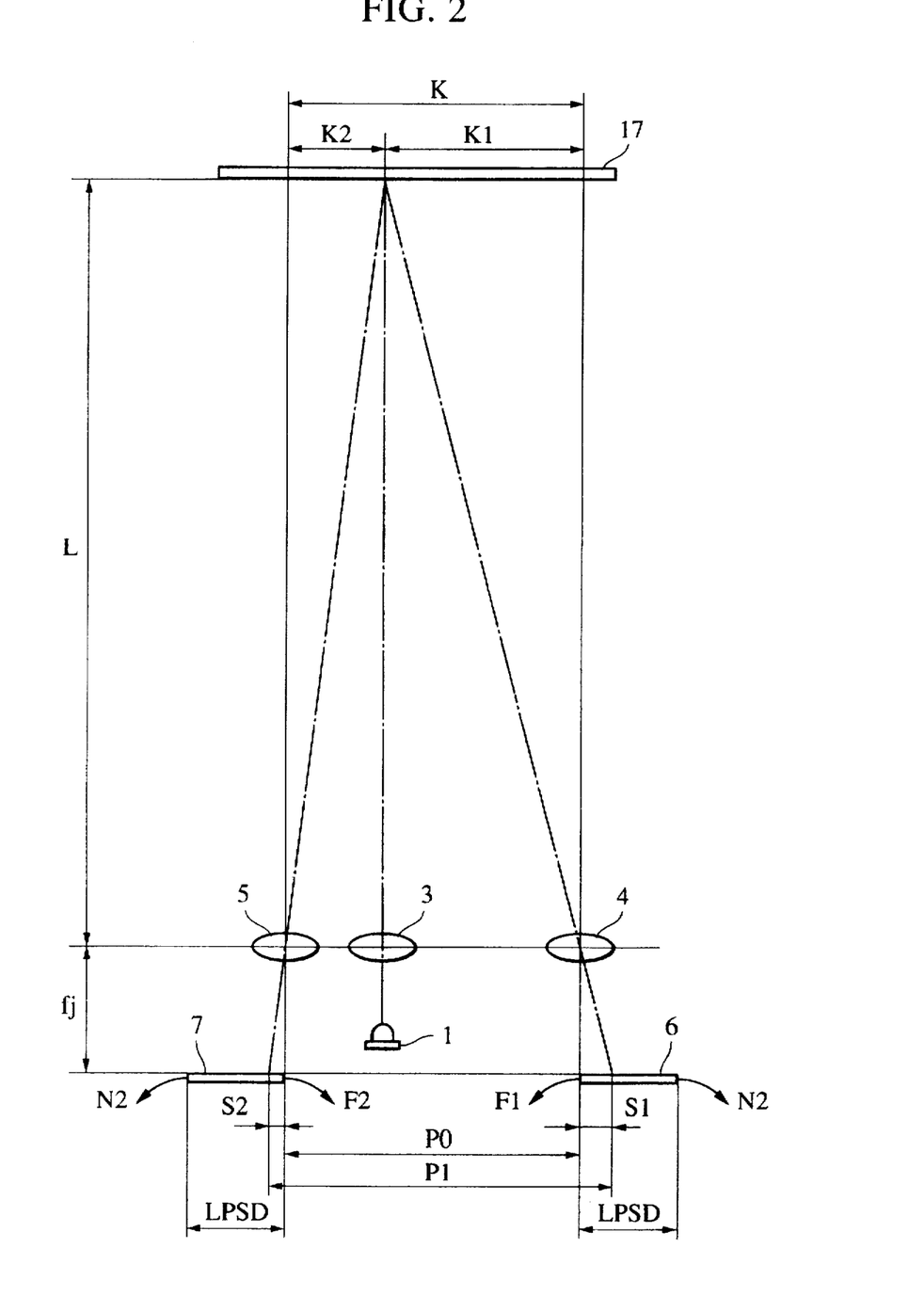
FIG. 2 is a diagram of an optical system of the range finder shown in FIG. 1.

The distance measurement principle of the range finder of FIG. 1 will now be described with reference to FIG. 2. In FIG. 2, the same components and quantities as those shown in FIG. 1 are indicated by the same reference characters.

An object 17 of distance measurement is at a distance L from the camera. The light receiving lenses 4 and 5 have focal lengths fj. The distance between the optical axes of the light receiving lenses 4 and 5 in the base length direction is K. The distance between the optical centroid points of the received-light images when the distance to the object is infinitely great is P0. The distance between the optical centroid points of the received-light images when the distance to the object is L is P1.

A triangle having an apex corresponding to the centroid of the projected-light image on the object and having a base corresponding to P1 is similar to a triangle also having an apex corresponding to the centroid of the projected-light image on the object and having a base corresponding to the distance K along the base length direction of the light receiving lenses 4 and 5. Therefore, $$(L/K)=(L+fj)/P1 \tag{1}$$

Equation (1) is transformed into $$L=(fj \times K)/(P1-K) \tag{2}$$

In equation (2), fj and K are known. Therefore, the distance can be determined by measuring P1.

According to this method, no measuring error occurs because the relationship of the equations (1) and (2) is not changed even if the projected-light image covers only a part of the object or if the portion of the object on which the projected-light image is formed has a contrast such that the optical centroid of the image changes to laterally shift the apexes of the above-mentioned rectangles.

If the amounts of movement of the received-light images on the light receiving sensors 6 and 7 corresponding to the change in the distance to the object between the infinite value and L are S1 and S2, respectively, then $$P1-K=S1+S2 \tag{3}$$

The ratio of the amount of movement of the received-light image on each light receiving sensor to the entire length of the light receiving sensor and the ratio of the outputs are equal to each other as expressed below.

$$S1/LPSD=N1/(F1+N1) \tag{4}$$

$$S2/LPSD=N2/(F2+N2) \tag{5}$$

From equations (4) and (5), $$S1+S2=LPSD \{N1/(F1+N1)+N2/(F2+N2)\} \tag{6}$$

When the entire received-light images are on the light receiving sensors 6 and 7, $$F1+N1=F2+N2$$

since light receiving sensors 6 and 7 are equal in entire length LPSD, and the light receiving lenses 4 and 5 are equal in focal length fj and in effective diameter.

Then, using F1+N1=FN, F2+N2=FN, equation (6) is changed into $$S1+S2=LPSD \{(N1+N2)/FN\} \tag{7}$$

From equation (3) and equation (7), $$P1-K=LPSD \{(N1+N2)/FN\} \tag{8}$$

Equation (8) is substituted in equation (2) to obtain $$L=\{(fj \times K)/LPSD\} \cdot \{FN/(N1+N2)\} \tag{9}$$

Since fj, K and LPSD are known, "FN/(N+N2)" is measured and calculated to determine the distance.

Furthermore, $$\begin{aligned} FN/(N1+N2) &= 2FN/\{2(N1+N2)\} \\ &= (F1+N1+F2+N2)/\{2(N1+N2)\} \end{aligned}$$

Then, from equation (9), $$L=(fj \times K)/(2 \times LPSD \cdot \{F1+N1+F2+N2)/(N1+N2)\} \tag{10}$$

is obtained. Thus, the distance can be determined by measuring and calculating "(F1+N1+F2+N2)/(N1+N2)".

If the outputs of the two light receiving sensors are accurately measured, F1+N1≈F2+N2 due to a variation in the characteristics of the sensitivity processing circuit and so on. Therefore, the distance measuring accuracy is higher when using equation (10) than when using equation (9).

Figure 3A:
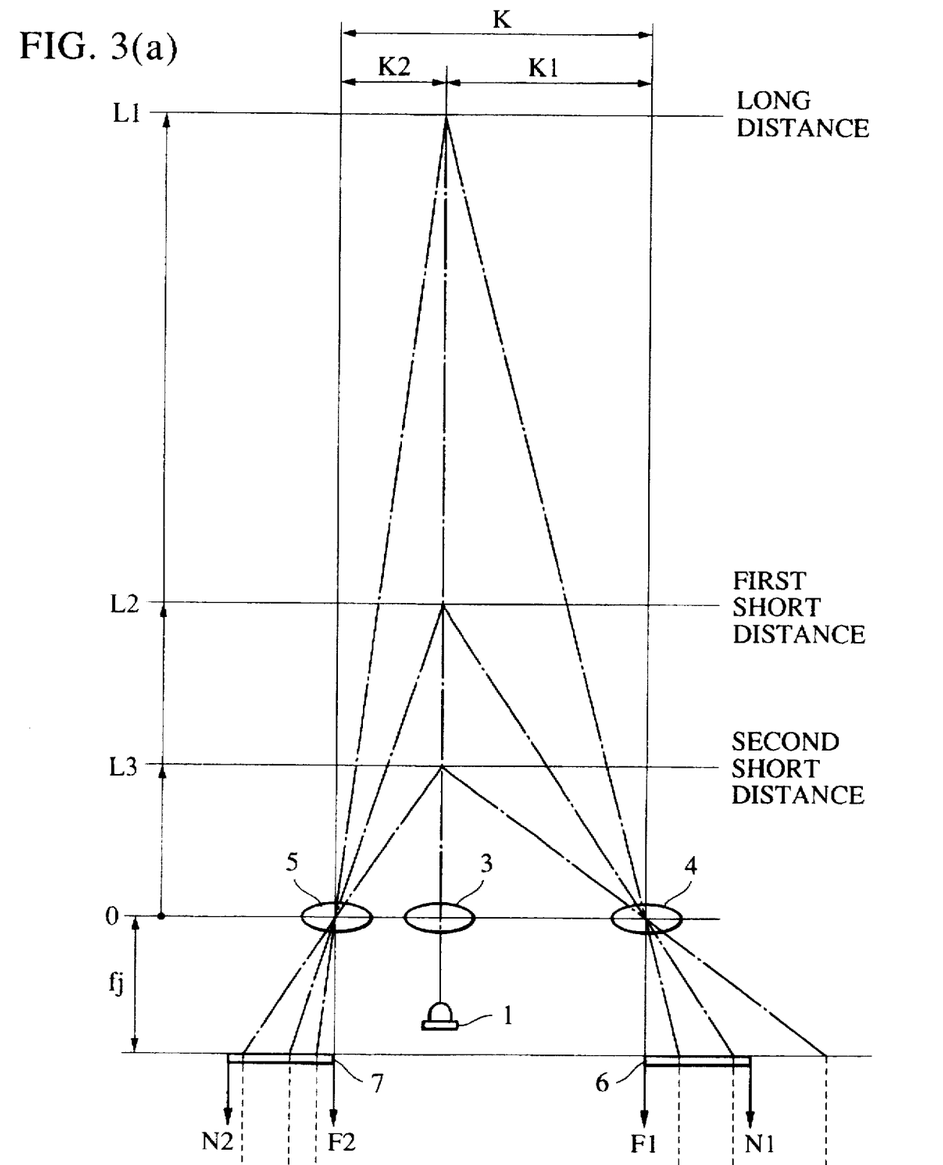
FIGS. 3(a) and 3(b) are diagrams of the relationship between the distance and the position of received-light images in the first embodiment of the invention.
Figure 3B:
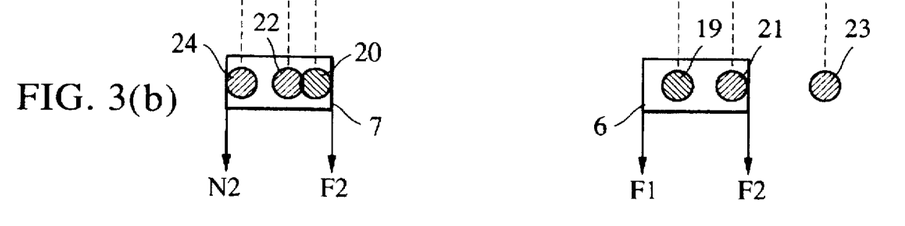

FIGS. 3(a) and 3(b) are diagrams showing the relationship between the distance to the object and the received-light image. Components 1 and 3 to 7 shown in FIGS. 3(a) and 3(b) are the same as those shown in FIG. 1. FIG. 3(a) shows side views of light receiving sensors 6 and 7 while FIG. 3(b) shows front views of the same.

Three distances to respective objects, i.e., a long distance L1, a first short distance L2 and a second short distance L3 (smaller than the first short distance L2), are illustrated. A received-light image 19 is formed by the light receiving lens 4 when the object is at the long distance. A received-light image 20 is formed by the light receiving lens 5 when the object is at the long distance. A received-light image 21 is formed by the light receiving lens 4 when the object is at the first short distance. A received-light image 22 is formed by the light receiving lens 5 when the object is at the first short distance. A received-light image 23 is formed by the light receiving lens 4 when the object is at the second short distance. A received-light image 24 is formed by the light receiving lens 5 when the object is at the second short distance.

When the object is positioned in the range from the long distance to the first short distance, the received-light images are on the light receiving sensor 6 and 7, the above-described equations (4) and (5) are established and the distance to the object can be determined by the above-described equation (10). In this case, the distance can be measured without being affected by the contrast of the object or incompleteness of the projected light spot.

On the other hand, when the object is positioned in the range from the first short distance to the second short distance, the received-light image 24 is on the light receiving sensor 7 but the received-light image 23 is out of the area of the light receiving sensor 6, so that the above-described equation (4) is not established. In this case, if the distance is calculated by the above-described equation (10), the result of the calculation does not coincide with the actual distance.

In this embodiment, therefore, the distance is measured only through the second light receiving means, i.e., the light receiving sensor 7 when the object is located in the range from the first short distance to the second short distance.

From the principle of distance measurement based on triangulation, $$L = (fj \times K2)/S2 \tag{11}$$

From the above-described equation (5) and equation (11), $$L = (fj \times K2)/LPSD \cdot \{(F2+N2)/N2\} \tag{12}$$

Since fj, K2 and LPSD are known, the distance can be determined from the above-described equation (12).

Figure 4:
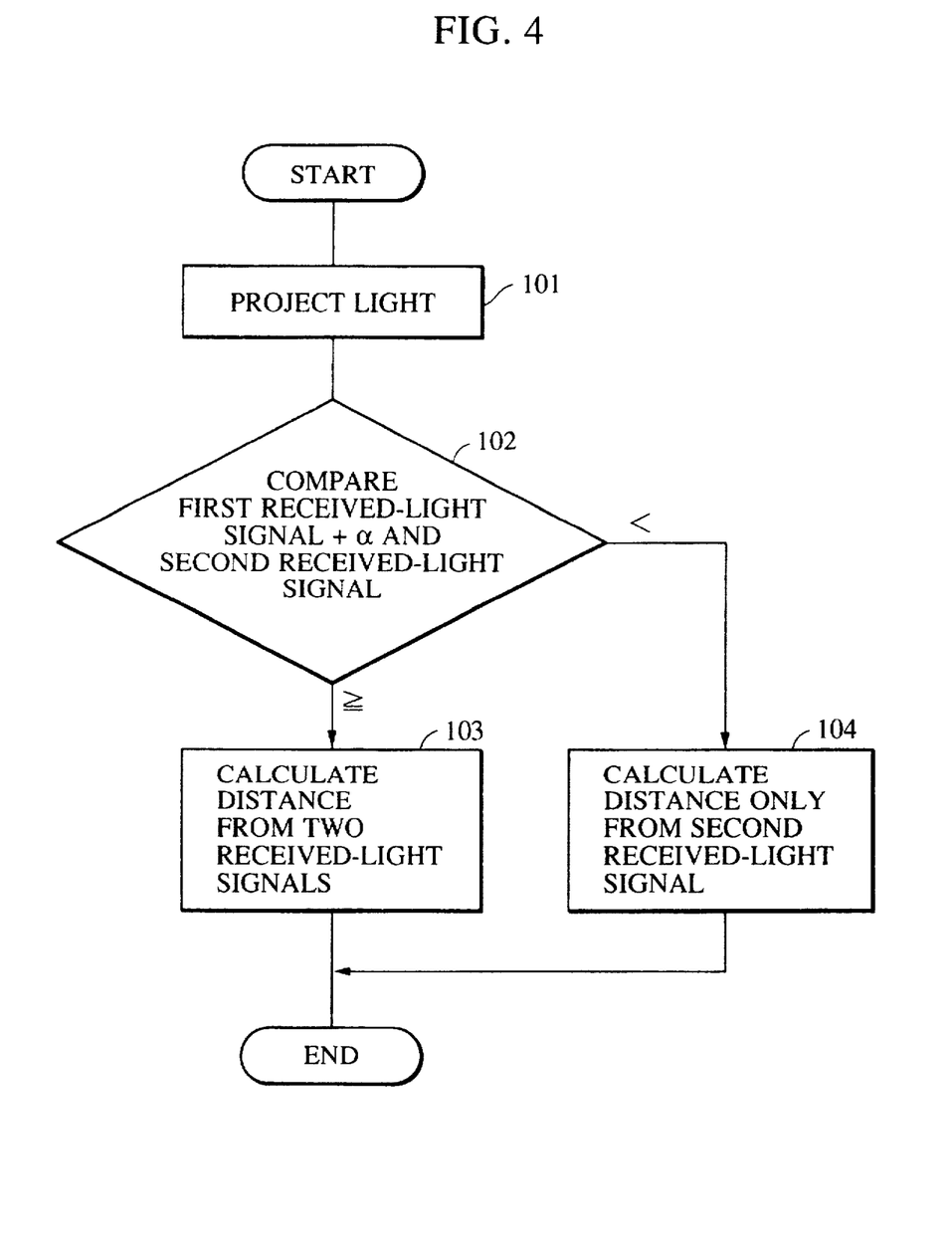
FIG. 4 is a flowchart of the operation of the range finder in accordance with the first embodiment of the invention.

The overall operation will be described with reference to the flowchart of processing of the control circuit 16 shown in FIG. 4.

[Step 101] A light projecting signal is output to the drive circuit 2 by the control means 16, thereby emitting light from the light projecting device 1. The light emitted passes through the light projecting lens 3 and travels toward the object.

The light projected to the object is reflected by the object, and a part of the reflected light is received by the light receiving lenses 4 and 5 to form images on the light receiving sensors 6 and 7. The light receiving sensors 6 and 7 convert signals of the received light into electrical signals and output the same to the signal processing circuits 8 to 11 in the subsequent stage.

In the signal processing circuits 8 to 11, the input signals are amplified and integrated. The amplified and integrated signals are converted into digital signals by the A/D converters 12 to 15 in the subsequent stage. The converted signals are input to the control circuit 16.

[Step 102] From the input digital signals, the control circuit 16 makes a determination with respect to the outputs of the first and second light receiving means (light receiving sensors 6 and 7). When the distance to the object is smaller than the above-mentioned first short distance, the received-light image on the light receiving sensor 6 moves out of the area of this sensor, and only the light on the sensor 6 in the received light is converted into electrical signal, so that "(first received light signal)< (second received-light signal)". A threshold value α is provided to prevent determination errors due to a variation in the characteristics of the circuits for processing the first and second received-light signals, a variation in the characteristics of the optical systems, noise in the circuits and the like.

Then, the control circuit 16 compares "first received-light signal (F1+N1)+α" and "second received-light signal (F2+N2)".

If "(F1+N1)+α"<"(F2+N2)" as a result of this comparison, the process advances to Step 104. If "(F1+N1)+α"≧"(F2+N2)", the process advances to Step 103.

[Step 103] Distance measurement free from an error due to contrast or the like is performed by processing the first and second received-light signals by the above-described equation (10).

[Step 104] The distance between the first short distance and the second short distance is measured by processing the second received-light signal by the above-described equation (12).

In FIGS. 5 to 8, the abscissa represents the distance from the infinite distance corresponding to the origin to the second short distance.

Figure 6:
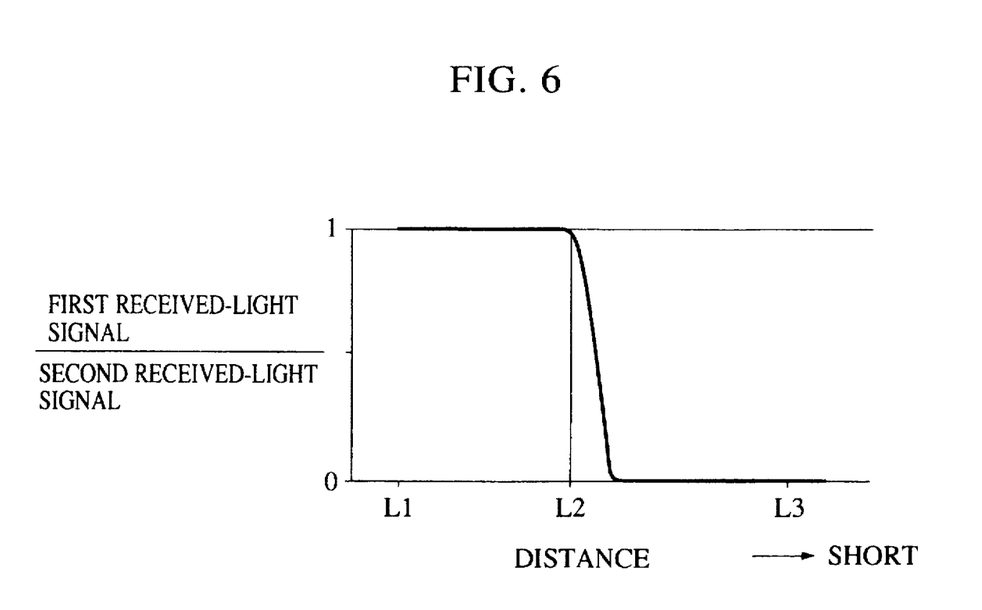
FIG. 6 is a graph of the ratio of a first received-light signal and a second received-light signal in the first embodiment of the invention.

FIG. 6 is a graph in which the ordinate represents the ratio of the first received-light signal to the second received-light signal in this embodiment. When the distance is smaller than L2, the received-light image on the light receiving sensor 6 moves out of the area of this sensor, so that "(first received-light signal)/(second received-light signal)" becomes closer to zero.

Figure 5:
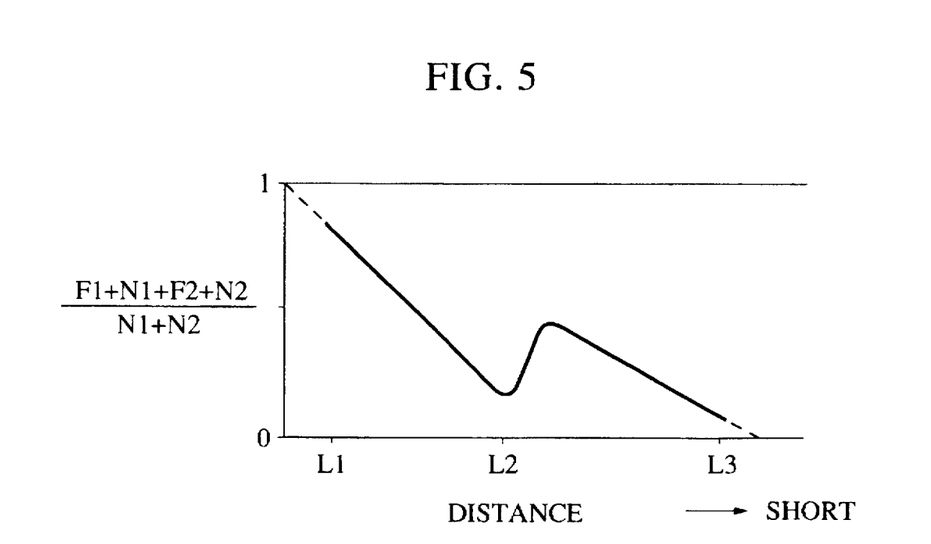
FIG. 5 is a graph showing the relationship between the distance and the result of a distance-measuring calculation in a conventional range finder.
Figure 7:
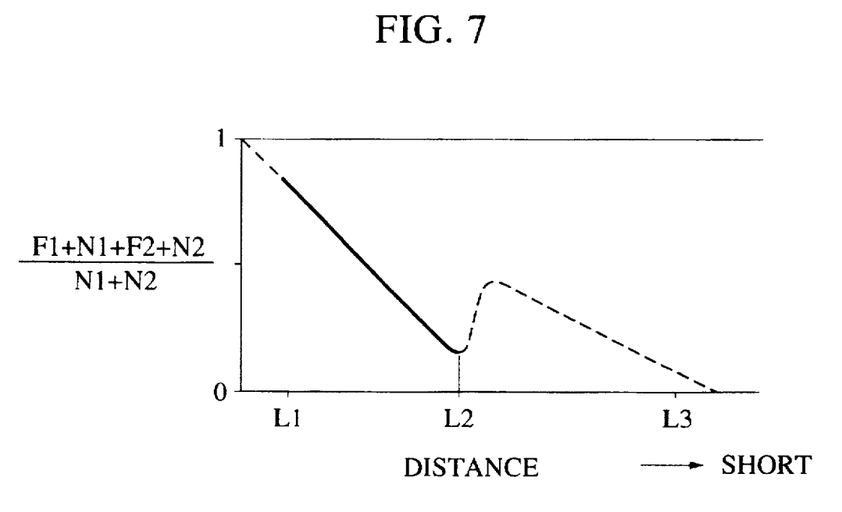
FIG. 7 is a graph showing the relationship between the distance and the result of a distance-measuring calculation using the first and second received-light signals in the first embodiment of the invention.
Figure 8:
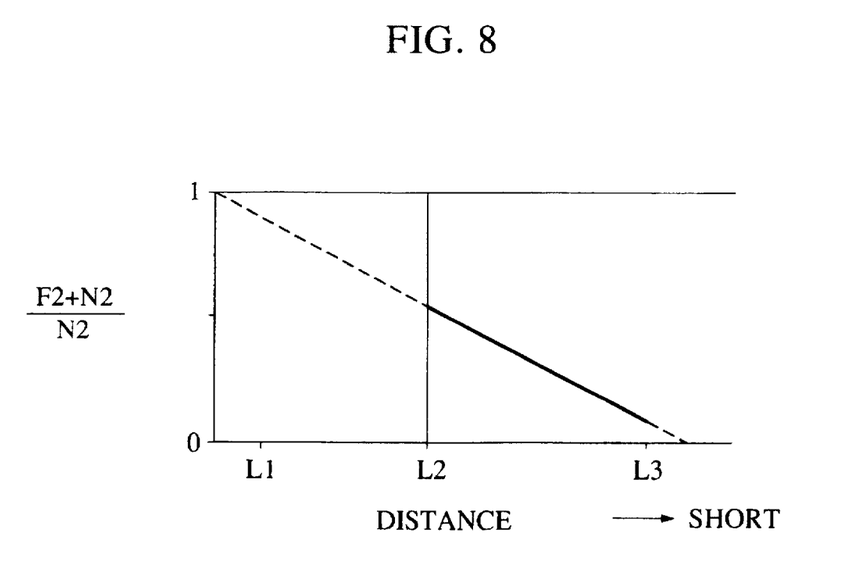
FIG. 8 is a graph showing the relationship between the distance and the result of a distance-measuring calculation based only on the second received-light signal in the first embodiment of the invention.

FIGS. 5, 7 and 8 show results (along the ordinate) of measurements of the distance (along the abscissa). FIG. 5 shows an example of measurement by the conventional method. In the conventional method, as described above, "(F1+N1+F2+N2)/(N1+N2)" is measured through the two received-light outputs to determine the distance from the long distance to the second short distance. In the range from L2 to L3, therefore, a non-linearity of the result of distance measurement, i.e., a measurement error, occurs.

FIGS. 7 and 8 show results of measurement in this embodiment. In the range from L1 to L2 in which "(first received light signal)/(second received light signal)≈1", the distance is determined by measuring and calculating "(F1+N1+F2+N2)/(N1+N2)". In the range from L2 to L3 in which "(first received light signal)<(second received light signal)", the distance is determined by measuring and calculating "(F2+N2)/(N2)". Thus, the distance can be measured through the range from the long distance to the second short distance.

Figure 9:
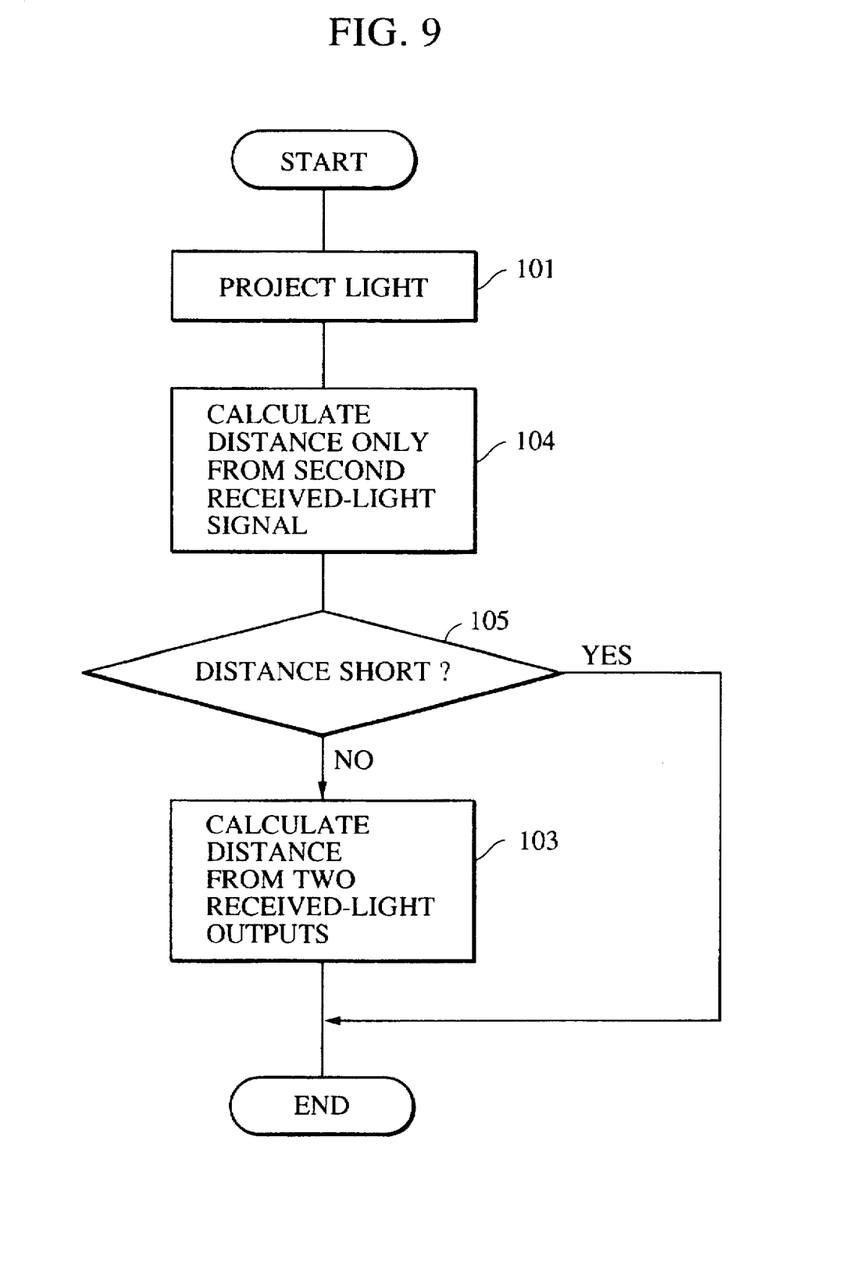
FIG. 9 is a flowchart of the operation of a range finder that represents a second embodiment of the present invention.

FIG. 9 is a flowchart of processing of control circuit 16 in accordance with a second embodiment of the present invention. The second embodiment is the same as the first embodiment in circuit configuration and so on. Therefore, only the operation of the second embodiment will be described with reference to the flowchart of FIG. 9, in which the same steps as those of the first embodiment (FIG. 4) are represented by the same step numbers.

In Step 101, the same operation is performed in the same manner as the first embodiment, that is, light is projected toward the object, reflected light from the object is received and received-light signals are input to the control circuit 16 through the A/D converters.

In Step 104, a distance-measuring calculation is performed by using the second received-light signal. The distance in the range from the long distance to the second short distance can be measured.

In Step 105, a determination is made as to whether the distance determined (measurement result) in Step 104 is smaller than a predetermined distance (L2 in the second embodiment). If the measured distance is smaller than the predetermined distance, the obtained distance measurement data is directly used and the operation is terminated. If the measured distance is equal to or larger than the predetermined distance, the process moves to Step 103 to perform a distance-measuring calculation by using the received-light signals from the two sensors.

As described above, the distance-measuring calculation is performed by using the output (second received-light signal) from light receiving sensor 7, which is capable of measuring the distance from the second short distance to the long distance. If the distance thereby calculated is in the range from the long distance, to the first short distance in which range the distance-measuring calculation using the received-light signals from the two sensors is linear, a distance-measuring calculation using the received-light signals from the two sensors is performed. By using this method, it is possible to provide a range finder free from measurement error even if the distance measurement object has a certain contrast.

Figure 10A:
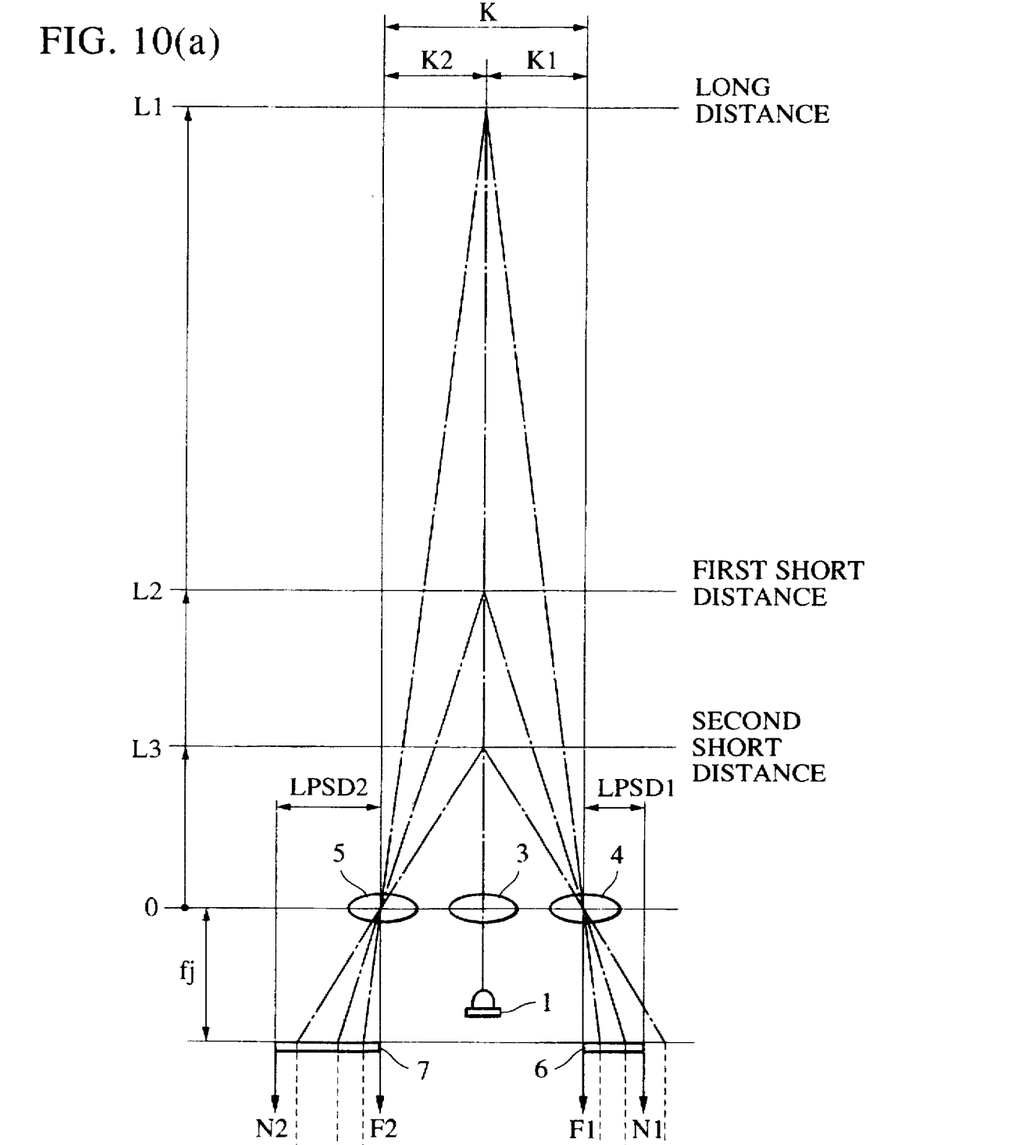
FIGS. 10a and 10b are diagrams showing the relationship between the distance and the position of received-light images in a range finder that represents a third embodiment of the present invention.
Figure 10B:
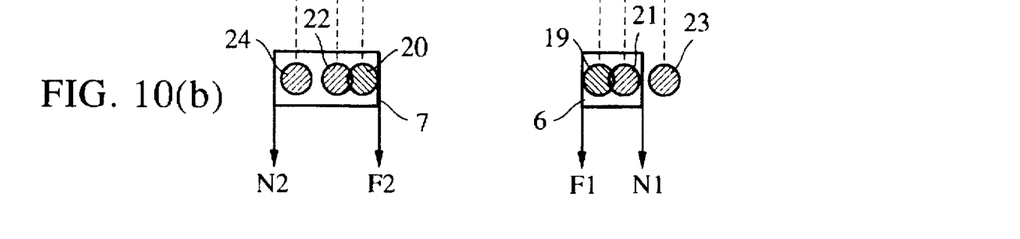

FIG. 10 is a diagram of the configuration of an optical system of a range finder that represents a third embodiment of the present invention. In FIG. 10, the same components and quantities as those shown in FIG. 3 are indicated by the same reference characters.

This embodiment differs from the first embodiment in that the distances K1 and K2 of the optical axes of the light receiving lenses 4 and 5 from the optical axis of the light projecting lens 3 are the same, and that the two light receiving sensors have different lengths LPSD1 and LPSD2. The shorter light receiving sensor (light receiving sensor 6) is used as first light receiving means while the longer light receiving sensor (light receiving sensor 7) is used as second light receiving means. Distance measurement can be performed by the same control as in the first or second embodiment.

According to each of the above-described embodiments, when the object is located in the range from the long distance to the first short distance (ordinary photographing distance), accurate distance measurement can be performed without being affected by the contrast of the object, incompleteness of the projected light spot or the like.

When the object is located in the range from the first short distance to the second short distance (macrophotographing distance or the like), the probability of a reduction in the completeness of the projected light spot is low and the influence of the contrast of the object upon measurement through the projected light image is small because the object is so close to the range finder that the object is sufficiently larger than the projected light image. Therefore, the distance in the range from the first short distance to the second short distance can be measured by using only the second received-light signal.

Therefore, it is possible to provide an accurate range finder having a wide distance measuring range from a long distance to a short distance.

Other applications of the present invention based on the above-described embodiments are possible in which two or more light projecting means and three or more light receiving means are provided.

Further applications of the present invention based on the above-described embodiments are possible in which two light receiving means may have any distance measuring ranges between a long distance and a short distance. For example, the distance to an object in a short-distance range is measured by combining information from two light receiving means while the distance to the object in a long-distance range is measured by using information from one of the two light receiving means.

Still further applications of the present invention based on the above-described embodiments are possible in which any positional relationship may be set between two light receiving means provided in association with a light projecting means as long as reflected light is received at different positions.

Still further applications of the present invention based on the above-described embodiments are possible in which processing for determining the distance to an object by combining information from two light receiving means and processing for determining the distance to the object by using information from one of the two light receiving means are performed in parallel with each other.

The present invention can also be applied to arrangements for projecting and receiving a signal in the form of a sound wave, an electric wave and the like, i.e., waves other than light.

While the present invention has been described with respect to what is presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are well-known in the camera arts and their specific construction and operation are not critical to the operation or best mode for carrying out the invention.

According to the present invention, the above-described embodiments or their technical elements may be combined as desired.

According to the present invention, the entire or a part of each arrangement according to the appended claims may form one unit, may be combined with a different unit or may be used as an element constituting a unit.

The present invention can also be applied to various types of cameras, such as single-lens reflex cameras, leaf-shutter cameras and video cameras, various optical apparatuses other than cameras, other kinds of apparatuses, and units or elements constituting such cameras, optical apparatuses and other kinds of apparatuses.

What is claimed is:

1. An apparatus that measures a distance to an object by projecting light, receiving reflected light of the projected light through at least two light receiving devices disposed at different positions, and combining information from the two light receiving devices to cancel the influence of a change in a centroid position of the reflected light at the same distance, said apparatus comprising:

a signal processor that performs a first processing operation for determining the distance to the object by combining information from the two light receiving devices, and a second processing operation for determining the distance to the object using information from only one of the two light receiving devices.

2. An apparatus according to claim 1, wherein said signal processor selectively performs the first processing operation and the second processing operation.

3. An apparatus according to claim 1, wherein said signal processor compares output levels of the two light receiving devices.

4. An apparatus according to claim 3, wherein said signal processor performs the first processing operation and the second processing operation according to a result of a comparison of the output levels of the two light receiving devices.

5. An apparatus according to claim 3, wherein said signal processor selectively performs one of the first processing operation and the second processing operation according to a result of a comparison of the output levels of the two light receiving devices.

6. An apparatus according to claim 3, wherein said signal processor performs the first processing operation when the difference between the output levels of the two light receiving devices is smaller than a predetermined value according to a result of a comparison of the output levels of the two light receiving devices.

7. An apparatus according to claim 3, wherein said signal processor performs the second processing operation when the difference between the output levels of the two light receiving devices is larger than a predetermined value according to a result of a comparison of the output levels of the two light receiving devices.

8. An apparatus according to claim 1, wherein said signal processor performs the first processing operation according to a result of the second processing operation.

9. An apparatus according to claim 1, wherein said signal processor performs the first processing operation when the distance to the object determined by the second processing operation is within a predetermined distance range.

10. An apparatus according to claim 1, wherein said signal processor determines the distance to the object by the first processing operation when the distance to the object determined by the second processing operation is larger than a predetermined distance.

11. An apparatus according to claim 1, wherein said signal processor determines the distance to the object by the second processing operation when the distance to the object determined by the second processing operation is smaller than a predetermined distance.

12. An apparatus according to claim 1, wherein said signal processor performs the first processing operation and the second processing operation in accordance with the distance to the object.

13. An apparatus according to claim 1, wherein said signal processor selectively performs the first processing operation and the second processing operation according to the distance to the object.

14. An apparatus according to claim 1, wherein said signal processor determines the distance to the object by the first processing operation when the distance to the object is larger than a predetermined distance.

15. An apparatus according to claim 1, wherein said signal processor determines the distance to the object by the second processing operation when the distance to the object is smaller than a predetermined distance.

16. An apparatus according to claim 1, further comprising a light projector that projects light.

17. An apparatus according to claim 16, wherein each of said two light receiving devices outputs a signal according to a received light centroid position of the reflected light.

18. An apparatus according to claim 1, wherein each of said two light receiving devices outputs a signal according to a received light centroid position of the reflected light.

19. An apparatus according to claim 1, wherein said apparatus comprises a range finder.

20. An apparatus according to claim 1, wherein said apparatus comprises an optical device.

21. An apparatus according to claim 1, wherein said apparatus comprises a camera.

22. An apparatus that measures a distance to an object by projecting light, receiving reflected light of the projected light through at least two light receiving devices disposed at different positions, and combining information from the two light receiving devices to cancel the influence of a change in a centroid position of the reflected light at the same distance, said apparatus comprising:

a signal processor that performs a first processing operation for determining the distance to the object using information from the two light receiving devices, and a second processing operation for determining the distance to the object using information from only one of the two light receiving devices.

23. An apparatus according to claim 22, wherein said apparatus comprises a range finder.

24. An apparatus according to claim 22, wherein said apparatus comprises an optical device.

25. An apparatus according to claim 22, wherein said apparatus comprises a camera.

26. An apparatus that measures a distance to an object by projecting light, receiving reflected light of the projected light through at least two light receiving devices disposed at different positions, and combining information from the two light receiving devices to cancel the influence of a change in a centroid position of the reflected light at the same distance, said apparatus comprising:

a signal processor that performs a first processing operation for determining the distance to the object by combining information from the two light receiving devices, and a second processing operation for determining the distance to the object without combining information from the two light receiving devices.

27. An apparatus according to claim 26, wherein said apparatus comprises a range finder.

28. An apparatus according to claim 26, wherein said apparatus comprises an optical device.

29. An apparatus according to claim 26, wherein said apparatus comprises a camera.

30. An apparatus that measures a distance to an object by projecting a signal, receiving a reflected signal of the projected signal through at least two signal receiving devices disposed at different positions, and combining information from the two signal receiving devices to cancel the influence of a change in a centroid position of the reflected signal at the same distance, said apparatus comprising:

a signal processor that performs a first processing operation for determining the distance to the object by combining information from the two signal receiving devices, and a second processing operation for determining the distance to the object using information from only one of the two signal receiving devices.

31. An apparatus that measures a distance to an object by projecting a signal, receiving a reflected signal of the projected signal through at least two signal receiving devices disposed at different positions, and combining information from the two signal receiving devices to cancel the influence of a change in a centroid position of the reflected signal at the same distance, said apparatus comprising:

a signal processor that performs a first processing operation for determining the distance to the object using information from the two signal receiving devices, and a second processing operation for determining the distance to the object using information from only one of the two signal receiving devices.

32. An apparatus that measures a distance to an object by projecting a signal, receiving a reflected signal of the projected signal through at least two signal receiving devices disposed at different positions, and combining information from the two signal receiving devices to cancel the influence of a change in a centroid position of the reflected signal at the same distance, said apparatus comprising:

a signal processor that performs a first processing operation for determining the distance to the object by combining information from the two signal receiving devices, and a second processing operation for determining the distance to the object without combining information from the two signal receiving devices.

* * * * *

UNITED STATES PATENT AND TRADEMARK OFFICE
CERTIFICATE OF CORRECTION

PATENT NO. : 5,754,281

DATED : May 19, 1998

INVENTOR(S): KAZUYUKI MAEDA

Page 1 of 2

It is certified that error appears in the above-identified patent and that said Letters Patent is hereby corrected as shown below:

ON THE COVER PAGE

AT [57] - ABSTRACT:

Line 7, "performs" should read --that performs--.

COLUMN 1:

Line 45, "large" should read --large,--;
   Line 47, "one," should read --one aspect,--; and
   Line 52, "correct," should read --correct--.

COLUMN 2:

Line 55, "the" should be deleted; and
   Line 56, "lens" should read --lenses--.

UNITED STATES PATENT AND TRADEMARK OFFICE
CERTIFICATE OF CORRECTION

PATENT NO. : 5,754,281

DATED : May 19, 1998

INVENTOR(S) : KAZUYUKI MAEDA

It is certified that error appears in the above-identified patent and that said Letters Patent is hereby corrected as shown below:

COLUMN 5:

Line 65, "received light" should read --received-light--.

Signed and Sealed this

Eighth Day of December, 1998

BRUCE LEHMAN

Attest:

Attesting Officer

Commissioner of Patents and Trademarks